United States Patent [19]

Szinicz

[11] Patent Number: 5,425,644
[45] Date of Patent: Jun. 20, 1995

[54] SURGICAL TRAINING APPARATUS AND METHOD

[76] Inventor: Gerhard Szinicz, Landeskrankenhaus Bregenz, Chirurgische Abteilung, Carl-Pedenz-Strasse 2, 6900 Bregenz, Austria

[21] Appl. No.: 61,789

[22] Filed: May 13, 1993

[51] Int. Cl.⁶ .............................................. G09B 23/28
[52] U.S. Cl. .................................... 434/268; 434/267
[58] Field of Search .............. 434/267, 268, 272, 262; 119/259, 248, 246

[56] References Cited

U.S. PATENT DOCUMENTS

| | | | |
|---|---|---|---|
| 2,871,579 | 2/1959 | Niiranen et al. | 434/268 |
| 2,995,832 | 8/1961 | Alderson | 434/268 |
| 5,149,270 | 9/1992 | McKeown | 434/262 |

FOREIGN PATENT DOCUMENTS

| | | | |
|---|---|---|---|
| 4105892 | 8/1992 | Germany | 434/272 |
| 1488869 | 6/1989 | U.S.S.R. | 434/268 |
| 9215979 | 9/1992 | WIPO | 434/268 |

OTHER PUBLICATIONS

"Operative laparoscopy," Fertility and Sterility, vol. 47, No. 1, Jan. 1987.

Primary Examiner—Gene Mancene
Assistant Examiner—Jeffrey A. Smith
Attorney, Agent, or Firm—Dilworth & Barrese

[57] ABSTRACT

An apparatus is provided that is adapted to be used in training surgeons and surgical personnel in surgical techniques and procedures, and more particularly to an apparatus and method for training surgeons and surgical personnel in minimally invasive surgical techniques and procedures in a manner which closely replicates clinical phenomena. The apparatus of the invention includes a frame, a pump, appropriate tubing and a reservoir containing a volume of fluid. Non-living animal tissue is joined to the tubing at the outlet side of the pump and surgical personnel are permitted to conduct surgical techniques thereon.

17 Claims, 2 Drawing Sheets

SURGICAL TRAINING APPARATUS AND METHOD

TECHNICAL FIELD

The present invention relates to an apparatus that is adapted to be used in training surgeons and surgical personnel in surgical techniques and procedures, and more particularly to an apparatus and method for training surgeons and surgical personnel in minimally invasive surgical techniques and procedures in a manner which closely replicates clinical phenomena.

BACKGROUND OF THE INVENTION

Surgical personnel are trained in surgical techniques and procedures through a combination of teaching tools. Books and other written source materials are utilized. Video tapes and other audiovisual materials are also employed. Surgical personnel also routinely attend lectures, seminars and the like.

Surgical personnel receive clinical training and experience through preceptor and proctor arrangements. These clinical programs may employ actual patients, corpses, live animal models, deceased animal models, or a combination thereof. Regardless of the model employed, the objective is to provide surgical personnel with a training system which will educate the personnel to the clinical phenomena which may be expected in performing a given technique or procedure.

In providing surgical personnel training, it is desirable to minimize to the extent possible the use of live animal models. However, the use of non-living models in training programs, e.g., foam organs through "pelvic trainers", has heretofore limited the ability of surgical personnel to experience likely clinical stimuli and responses.

SUMMARY OF THE INVENTION

According to the present invention, an apparatus is provided which allows surgical personnel to experience closely replicated clinical phenomena with the use of non-living animal models. The apparatus comprises a fluid reservoir, a pump, tubing communicating between the fluid reservoir and the pump, and additional tubing communicating between the pump and a discharge point which is adapted to be associated with animal tissue. Further tubing may also be provided which is adapted to communicate between the non-living animal tissue and the reservoir, thereby providing a discharge flow path for fluid from the non-living animal tissue to the reservoir.

In a preferred embodiment, the apparatus further comprises a frame defining an interior region. In such preferred embodiment, the discharge point of the additional tubing is adapted to be positioned within the interior region such that non-living animal tissue may be positioned and accessed therewithin. The interior region may be bounded at its upper periphery by a resilient medium associated with the frame, the resilient medium serving to replicate a body wall through which surgical instruments are extended in minimally invasive surgical procedures, e.g., laparoscopic and thoracoscopic surgical procedures. The apparatus of the present invention thus enables surgical personnel to be trained in surgical procedures and techniques, and particularly in minimally invasive surgical procedures and techniques.

According to the training method of the invention, one or more non-living animal tissues, e.g., body organs from cattle and the like obtained from a slaughterhouse, are mounted to the discharge point of the tubing. The reservoir is filled with a fluid which preferably approximates the physical properties of blood, e.g., in viscosity, density, and color. The pump is actuated, thereby feeding the fluid into the non-living animal tissue. As the surgical personnel perform a given surgical technique or procedure on the non-living animal tissue, the tissue will closely replicate clinical phenomena a surgeon may expect to encounter in an actual surgical procedure.

In a preferred training method according to the invention, the discharge point is positioned within an interior region defined by a frame. A resilient medium which is preferably opaque bounds the interior region at an upper periphery thereof. Surgical personnel extend surgical instruments through the resilient medium, e.g., one or more trocars, endoscopes, graspers, dissectors, clip appliers, staplers, and the like. The pump feeds fluid from the reservoir to non-living animal tissue mounted to the discharge point of the tubing. Preferably, fluid exits the tissue through additional tubing and returns to the reservoir, thereby replicating a circulatory system. Surgical personnel are thus able to develop and improve upon skills particularly suited to minimally invasive surgical procedures.

The apparatus and method of the invention provide useful tools to surgeons and surgical personnel in learning and mastering surgical procedures and techniques. Moreover, the apparatus and method may be employed in developing new surgical techniques and procedures.

BRIEF DESCRIPTION OF THE DRAWINGS

The invention will be more clearly understood from the detailed description which follows with reference to the drawings appended hereto, in which.

DETAILED DESCRIPTION OF THE INVENTION

Figure 1:
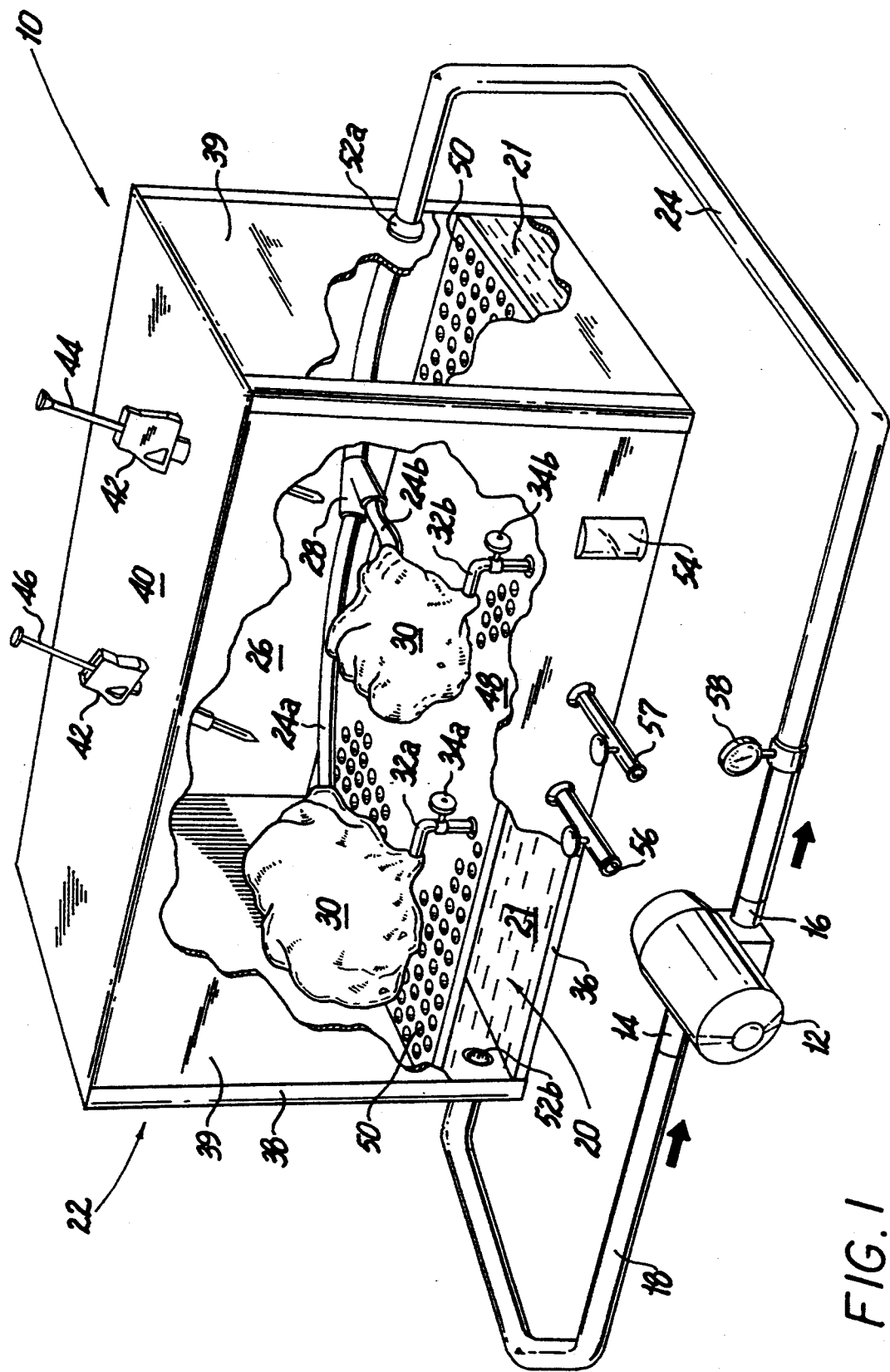
FIG. 1 is a plan view, opened up for viewing of internal structures, of an apparatus of the present invention.
Figure 2:
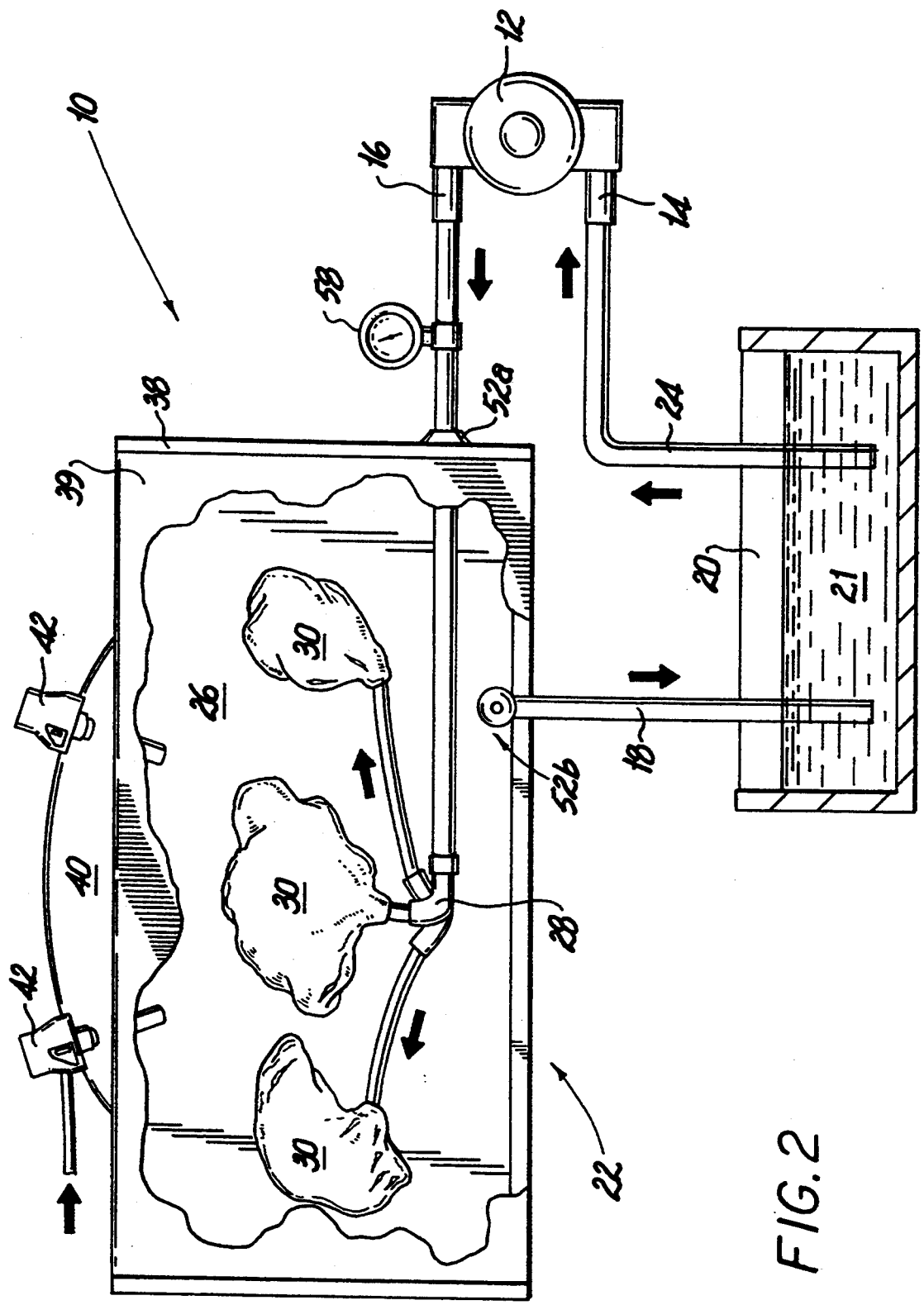
FIG. 2 is a side view of an alternative apparatus according to the invention.

Referring to the Figures, apparatus 10 includes a pump 12 with pump inlet 14 and pump outlet 16. Inlet tubing 18 is mounted to pump inlet 14 by known means, e.g., a hose clamp, and communicates with fluid reservoir 20 which is adapted to receive fluid 21. As shown in FIG. 1, reservoir 20 is formed in the base of frame 22. However, reservoir 20 may also be independent from frame 22, e.g., reservoir 20 may be a separate chamber adjacent pump 12 as shown in FIG. 2, without altering the overall function of the apparatus of the invention. Outlet tubing 24 is mounted to pump outlet 16 by known means and communicates with interior region 26 of frame 22. In a preferred embodiment, a peristaltic pump is employed as pump 12 with outlet tubing 24 of relatively large internal diameter (e.g., 0.25"), thereby providing a pulsating flow characteristic to fluid 21 as it passes through outlet tubing 24. Alternatively, a flow interrupter may be provided in the fluid flow path, e.g., attached to outlet tubing 24, to create a pulsating flow, if desired.

Outlet tubing 24 is adapted to communicate with one or more non-living body tissues which are preferably positioned within frame 22. Thus, to accommodate multiple tissues within frame 22, a fitting 28 may be mounted to outlet tubing 24 e.g., a "Y" or "T" fitting, to which may be mounted outlet tubings 24a and 24b. Similarly, additional outlet tubings may be provided by varying the type(s) and number(s) of fittings 28 mounted to outlet tubing 24. Each outlet tubing (24a, 24b) is adapted to be mounted to a non-living animal tissue 30, e.g., an animal organ such as a cow's heart, stomach, appendix, lung, or the like. Outlet tubing 24a, 24b may be mounted to tissue 30 in a variety of ways, e.g., utilizing the hepatic, mesenteric, and/or pulmonary artery associated with tissue 30 or a tissue flap from tissue 30 and joining such tissue with outlet tubing 24a, 24b by tightening a ligating loop positioned around the tissue/tubing joint. As will be appreciated, the fluid pressure within outlet tubing 24 and tissue 30 need not be high, thereby minimizing the risk that tissue 30 will separate from outlet tubing 24a, 24b.

In a preferred embodiment, tissue discharge tubing 32a, 32b is mounted to tissue 30 and communicates with reservoir 20, thereby completing a circulatory path for fluid 21. A manually controlled throttle valve 34a, 34b is provided in the flaw path of discharge tubing 32a, 32b to regulate the flow of fluid 21 from tissue 30 to reservoir 20. The rate of fluid flow into and out of tissue 30 is balanced through regulation of throttle valves 34a, 34b and pump 12. A further valve (not pictured) may be provided either on inlet tubing 18 or outlet tubing 24 to control the rate at which fluid 21 is fed to tissue 30.

Frame 22 provides the structure whereupon tissue 30 is manipulated by surgical personnel. In performing "open" surgical techniques and procedures, i.e., procedures which involve a full-scale surgical incision and which permit surgical personnel to directly access the subject tissue, frame 22 need provide no more than a base upon which tissue 30 may be rested. As shown in FIG. 1, apparatus 10 is particularly well suited for use in learning/practicing minimally invasive surgical techniques and procedures. Thus, frame 22 preferably includes a base 36 and upwardly extending members 38 which define interior region 26. Walls 39 may be provided on one or more sides of frame 22, and may extend all or part way up toward the top of members 38. A resilient medium 40 is located opposite base 36 and is supported by members 38. Medium 40 is intended to replicate the patient's body wall for training purposes and is thus preferably opaque so that personnel cannot see therethrough. Structures of this type are known and are variously referred to as "Goetz" or "pelvic" trainers. However, surgical personnel have heretofore been limited in the media upon which they may practice techniques and procedures using such trainers, employing such media as foam organs, slaughterhouse organs and the like.

Frame 22 further preferably includes a floor 48 upon which tissue 30 may be placed. Floor 48 may take the form of a grate or other suitable construction adapted to support tissue 30, and may also allow fluid flow therethrough. For example, in one embodiment of the invention floor 48 is constructed such that tissue 30 is supported from 3 to 4 cm above base 36 and honeycomb-like openings 50 of roughly 1 cm² are provided therethrough. Thus, reservoir 20 would be defined below floor 48 by side walls 39 and fluid return to reservoir 20 would be accomplished through the honeycomb-like openings 50 in floor 48, e.g., when tissue 30 is cut or punctured.

Bulk-head fittings 52a, 52b are preferably provided in walls 39 to facilitate the passage of tubings 18 and 24 into and out of frame 22. Tubings 18 and 24 are provided with appropriate fittings to engage and cooperate with bulk-head fittings 52a, 52b, as appropriate. A site glass 54 may also be provided in the wall 39 to permit inspection of the fluid level within frame 22, i.e., within reservoir 20 below floor 48, and one or more inlet spigots 57 may be provided to introduce additional fluid, e.g., to make up for fluid absorbed by tissue 30. An outlet port 56 may also be provided at the base 36 of frame 22 to facilitate discharge of fluid from reservoir 20 and subsequent cleaning. Additional gauges may be also be provided to monitor and permit regulation of the apparatus of the invention, e.g., one or more pressure gauges 58 associated with tubings 18, 24, and the like.

In a further embodiment of the invention and with particular reference to FIG. 2, frame 22 may be constructed such that interior region 26, which is bounded by base 36, walls 39 and medium 40, is substantially air-tight. Thus, personnel utilizing frame 22 may insufflate interior region 26, e.g., through a pneumoneedle and/or a trocar inserted through medium 40, and perform a minimally invasive procedure under conditions replicating an insufflated body cavity. Thus adapted, frame 22 allows surgical personnel to train on minimally invasive surgical personnel under conditions most closely corresponding to those to be encountered in clinical circumstances.

In practice, tissue 30 is introduced to frame 22 and joined to inlet and outlet tubing 18, 24, respectively. Reservoir 20 is charged with an appropriate fluid and pump 12 is activated. Fluid is thus circulated through tissue 30, preferably in a pulsating fashion as discussed above. Appropriate instrumentation is 42, 44, 46 directed toward tissue 30, e.g., through medium 40. Surgical personnel are thus able to practice/develop surgical procedures on tissue 30 under conditions which closely replicate clinical conditions. At the conclusion of a training session, tissue 30 is removed from frame 22 and the assembly is cleaned. Apparatus 10 is thus available for subsequent training sessions with the same or different forms of tissue.

Although the invention has been described with respect to preferred embodiments, it should be readily apparent to one of ordinary skill in the art that changes or modifications may be made without departing from the spirit or scope of the subject invention as defined by the appended claims.

What is claimed is:

1. A surgical training apparatus for use in conducting surgical techniques on non-living animal tissue, comprising:
   (a) a frame which includes a base and which defines an interior region above said base;
   (b) a reservoir within said frame which includes a volume of fluid;
   (c) a pump including an inlet and an outlet for transferring fluid from said reservoir to said interior region of said frame;
   (d) inlet tubing associated with said pump inlet and said reservoir;
   (e) outlet tubing associated with said pump outlet;
   (f) non-living animal tissue positioned in said interior region and connected to said outlet tubing; and
   (g) means for conducting said fluid from said non-living animal tissue positioned in said interior region back to said reservoir.

2. The apparatus of claim 1, wherein said frame further includes a floor which rests upon said base and which is adapted to support said non-animal tissue.

3. The apparatus of claim 2, wherein said floor comprises a grate.

4. The apparatus of claim 1, wherein said pump provides a pulsating fluid flow through said outlet tubing.

5. The apparatus of claim 4, wherein said pump is a peristaltic pump.

6. The apparatus of claim 1, further comprising a medium associated with said frame which extends above said interior region.

7. The apparatus of claim 6, wherein said frame further comprises side walls and said frame is substantially air-tight.

8. The apparatus of claim 1, wherein said reservoir is formed on said base of said frame.

9. The apparatus of claim 1, wherein said frame includes inlet and outlet spigots to facilitate cleaning thereof.

10. The apparatus of claim 1, wherein said non-living animal tissue is selected from the group consisting of animal organs obtained from a slaughterhouse.

11. The apparatus of claim 1, wherein said volume of fluid is selected such that said fluid exhibits physical properties closely replicating corresponding physical properties of human blood.

12. The apparatus of claim 1, wherein said means for conducting fluid comprises return tubing which is adapted to be joined to said non-living animal tissue and return fluid from said non-living animal tissue to said reservoir.

13. A method for conducting surgical techniques on non-living animal tissue, comprising:
   (a) obtaining non-living animal tissue from an appropriate source;
   (b) joining said non-living animal tissue to outlet tubing, said outlet tubing being joined to a pump at an opposite end;
   (c) providing a reservoir which contains a volume of fluid and inlet tubing extending from said reservoir to an inlet of said pump; and
   (d) providing a frame which includes a base;
   (e) positioning said non-living animal tissue on said base of said frame; and
   (f) activating said pump such that fluid is pumped from said reservoir, through said inlet and outlet tubings, and into said non-living animal tissue; and
   (g) conducting a surgical technique on said non-living animal tissue.

14. The method of claim 13, wherein said frame defines an air-tight interior region and wherein said method further comprises insufflating said interior region.

15. The method of claim 13, wherein a plurality of non-living animal tissues are joined to said outlet tubing, and wherein said plurality of non-living animal tissues are concurrently positioned on said base of said frame.

16. The method of claim 13, wherein said pump is adapted to provide a pulsating fluid flow to said non-living animal tissue.

17. A surgical training apparatus for use in conducting surgical techniques on non-living animal tissue, comprising:
   (a) a closed cavity adapted in size to receive non-living animal tissue, said closed cavity removable receiving an operative portion of at least one surgical instrument;
   (b) a reservoir for receiving and storing a volume of fluid;
   (c) a pump including an inlet and an outlet for transferring fluid from said reservoir into said cavity;
   (d) inlet tubing associated with said pump inlet and said reservoir;
   (e) outlet tubing associated with said pump outlet having an open end and extending into said cavity;
   (f) means for conducting said fluid from said cavity back to said reservoir.

* * * * *